(12) United States Patent
White, III et al.

(10) Patent No.: US 8,606,407 B2
(45) Date of Patent: Dec. 10, 2013

(54) ENERGY MANAGEMENT APPLICATION SERVER AND PROCESSES

(75) Inventors: William Anthony White, III, Carlisle, MA (US); Stefano D'Agostino, Nottingham (GB); Paul Stuart Bates, Leicestershire (GB)

(73) Assignee: Schneider Electric Buildings, LLC, Palatine, IL (US)

( * ) Notice: Subject to any disclaimer, the term of this patent is extended or adjusted under 35 U.S.C. 154(b) by 321 days.

(21) Appl. No.: 13/163,796

(22) Filed: Jun. 20, 2011

(65) Prior Publication Data

US 2012/0323368 A1 Dec. 20, 2012

(51) Int. Cl.
| | | |
|---|---|---|
| G05B 15/00 | (2006.01) | |
| G06F 15/173 | (2006.01) | |
| H04L 12/24 | (2006.01) | |
| G05B 15/02 | (2006.01) | |

(52) U.S. Cl.
CPC ............ *H04L 41/0213* (2013.01); *G05B 15/02* (2013.01)
USPC ................................ 700/275; 700/9; 709/223

(58) Field of Classification Search
None
See application file for complete search history.

(56) References Cited

U.S. PATENT DOCUMENTS

| | | | | |
|---|---|---|---|---|
| 7,333,880 | B2* | 2/2008 | Brewster et al. .............. | 700/286 |
| 7,676,280 | B1* | 3/2010 | Bash et al. ........................ | 700/17 |
| 7,734,572 | B2* | 6/2010 | Wiemeyer et al. .............. | 700/19 |
| 8,352,769 | B1* | 1/2013 | Ghose et al. ................... | 713/324 |
| 2004/0260431 | A1* | 12/2004 | Keenan et al. ................. | 700/295 |
| 2007/0112442 | A1* | 5/2007 | Zhan et al. ...................... | 700/29 |
| 2007/0112531 | A1* | 5/2007 | Zhan et al. ...................... | 702/69 |
| 2007/0233323 | A1* | 10/2007 | Wiemeyer et al. ............ | 700/276 |
| 2007/0295830 | A1* | 12/2007 | Cohen et al. ...................... | 700/9 |
| 2010/0238003 | A1 | 9/2010 | Chan et al. | |
| 2010/0241245 | A1* | 9/2010 | Wiemeyer et al. .............. | 700/19 |
| 2011/0061015 | A1* | 3/2011 | Drees et al. ................... | 700/275 |
| 2011/0144807 | A1* | 6/2011 | Buda et al. .................... | 700/275 |
| 2011/0219254 | A1* | 9/2011 | Zatylny et al. ................ | 713/340 |
| 2011/0258416 | A1* | 10/2011 | Moritz .......................... | 712/220 |
| 2011/0320833 | A1* | 12/2011 | R. et al. ......................... | 713/310 |
| 2012/0066759 | A1* | 3/2012 | Chen et al. ...................... | 726/15 |
| 2012/0158160 | A1* | 6/2012 | Baran et al. .................... | 700/83 |
| 2012/0191826 | A1* | 7/2012 | Gotesdyner et al. .......... | 709/221 |

OTHER PUBLICATIONS

Cisco Systems Inc., "JouleX and Cisco EnergyWise: Efficiently Manage Enterprise Energy", 2011, Received from the Internet at "www.cisco.com" on Jul. 17, 2013.*

(Continued)

*Primary Examiner* — Mohammad Ali
*Assistant Examiner* — Kelvin Booker
(74) *Attorney, Agent, or Firm* — Lando & Anastasi, LLP

(57) ABSTRACT

An energy management gateway is provided. The energy management gateway includes a memory, a processor coupled to the memory, a building management system (BMS) interface executed by the processor and an energy management system interface executed by the processor. The BMS interface is configured to receive a first message, the first message being structured according to an industrial protocol. The energy management interface is configured to translate the first message into a second message structured according to an energy management protocol different from the industrial protocol, the second message including a query comprising at least one command and a set of qualifiers, the query being addressed to at least one first endpoint and to provide the second message to a first domain member of a first domain including the at least one first endpoint, the first domain member being a device other than the at least one first endpoint.

19 Claims, 10 Drawing Sheets

(56) References Cited

OTHER PUBLICATIONS

Cisco Systems Inc., "Managing EnergyWise Using CiscoWorks LAN Management Solution—White Paper", 2009, Received from the Internet at "www.cisco.com" on Jul. 17, 2013.*
Cisco Systems Inc., "Cisco EnergyWise: Enabling End-to-End Enterprise Control over Electricity Costs and Carbon Emissions", 2011, Received from the Internet at "www.cisco.com" on Jul. 17, 2013.*
Cisco Systems Inc., "Cisco EnergyWise Design Guide", Sep. 2011, Received from the Internet at "www.cisco.com" on Jul. 17, 2013.*
Cisco Systems Inc. and Schneider Electric, "Torana: Cisco and Schneider Electric Business Energy Management", 2011, Received from the Internet at "www.cisco.com" on Jul. 17, 2013.*
Scheider Electric, "Torana Application Server for Cisco EnergyWise", 2012, Received from the Internet at "www.Scheider-Electric.com" on Jul. 17, 2013.*
Scheider Electric, "Press Release-Schneider Electric to Deliver Transformational Energy Management Capability with Cisco", Jul. 11, 2011, Received from the Internet at "www.Scheider-Electric.com" on Jul. 17, 2013.*
Cisco Systems Inc. and Schneider Electric, "Schneider Electric and Cisco EnergyWise-based Energy Management Solution for StruxureWare, Andover Continuum, TAC Vista and TAC I/A", 2011, Received from the Internet at "www.cisco.com" on Jul. 17, 2013.*
Lippis III, N.P., "Controlling Corporate Energy Consumption via the Enterprise Network: A New Approach to Achieving Energy Efficiency by Leveraging Network Infrastucture", Jan. 2009, Lippis Consulting Industry Paper.*
Pacom Systems Pty Ltd, "MODBUS BMS Interface—'An Intelligent Interface to MODBUS Controllers'", 2008, Retrieved from the Internet at "www.pacom.com" on Jul. 17, 2013.*
Schneider Electric and Cisco Systems Inc., "Schneider Electric/Cisco EnergyWise Network Architecture", Jun. 16, 2011, Retrieved from the Internet at "http://leafltd.eu/sites/default/files/CiscoTechnicalArchDiagram_0611_v04.pdf" on Jul. 18, 2013.*
Cisco Systems Inc., "Cisco EnergyWise Technology—Release Notes for the Cisco EnergyWise Orchestrator, EnergyWise Phase 2", Retrieved from the Internet at "www.cisco.com" on Jul. 18, 2013.*
FieldServer Technologies, "Driver Manual (Supplement to the FieldServer Instruction Manual)—FS-8700-86 Carrier DataPort", Aug. 2008.*
FieldServer Technologies, "Driver Manual (Supplement to the FieldServer Instruction Manual)—FS-8700-82 Carrier DataPort", May 2001.*
Cisco Systems Inc., "Cisco CGS 2520, Software Configuration Guide—Cisco IOS Release 12.2(53)EX", Aug. 2010.*
Franz, M. and Pothamsetty, V., "ModbusFW, Deep Packet Inspection for Industrial Ethernet", 2004, Cisco Systems Inc.*
Meckbach, G., "Cisco Adds Power Management to Switches", Jan. 2009, Network World Canada.*
"FieldServer Technologies Partners with Cisco Expanding the Reach of Cisco EnergyWise to Building Automation Systems Devices". Jun. 14, 2011. Retrieved from the Internet on Sep. 20, 2012, http://finance.yahoo.com/news/FieldServer-Technologies-iw-3618404934.html.
Cisco EnergyWise Confiruration Guide, EnergyWise Phase 1, Sep. 2009.
Cisco EnergyWise: Power Management Without Borders, White Paper, pp. 1-11.
Cisco EnergyWise: Summary and Concepts—White Paper. © 2009 Cisco Systems, Inc. pp. 1-5.
International Search Report and Written Opinion for PCT/US2012/043133 dated Oct. 4, 2012.
Jeong et al. "A Network Level Power Management for Home Network Devices". IEEE Transactions on Consumer Electronics, IEEE Service Center, New York, NY. vol. 54, No. 2. May 1, 2008. pp. 487-493.
Tompros et al. "A Novel Power Line Network Architecture for Managing the Energy Resources of the Residential Environment". Power Line Communications and Its Applications, 2009. ISPLC 2009. IEEE International Symposium. Mar. 29, 2009. pp. 211-216.
Tompros et al. Enabling Applicability of Energy Saving Applications on the Appliances of the Home Environment. IEEE Network, IEEE Service Center, New York, NY. vol. 23, No. 6. pp. 8-16. Nov. 1, 2009.

* cited by examiner

ENERGY MANAGEMENT APPLICATION SERVER AND PROCESSES

BACKGROUND

1. Technical Field

The technical field relates generally to monitoring usage of utilities and, more particularly, to methods and systems of facilitating communication between control systems and devices that consume electrical power.

2. Background Discussion

Building management systems control and conserve resources consumed by the operation of subsystems within buildings and other structures. The subsystems managed by a typical building management system include power supply, environmental control, lighting control, security and fire protection subsystems. The amount of resources consumed by these subsystems is substantial—nearing 70% of the total resources consumed within a building according to some estimates.

Conventional building management systems are implemented using a variety of standards and computing technologies. Some building management systems employ a hierarchical architecture in which management and configuration devices are connected to one another via a network. Under this architecture, each of the management and configuration devices is also connected to one or more control devices that monitor and control the operation of a subsystem of the building. The management and configuration devices allow users to initially configure, monitor and alter the behavior of the subsystems controlled by the control devices. Management and configuration devices are typically implemented using general purpose computer systems, such as a personal computer or laptop. Control devices are often proprietary, special purpose devices that include environmental sensors and that can alter the operation of a particular subsystem.

SUMMARY

According to one aspect, an energy management gateway is provided. The energy management gateway includes a memory, a processor coupled to the memory, a building management system (BMS) interface executed by the processor and an energy management system interface executed by the processor. The BMS interface is configured to receive a first message, the first message being structured according to an industrial protocol. The energy management interface is configured to translate the first message into a second message structured according to an energy management protocol different from the industrial protocol, the second message including a query comprising at least one command and a set of qualifiers, the query being addressed to at least one first endpoint and including at least one of a sum command and a set command. The energy management interface is also configured to provide the second message to a first domain member of a first domain including the at least one first endpoint, the first domain member being a device other than the at least one first endpoint.

In the gateway, the industrial protocol may include MODBUS, the energy management protocol may include EnergyWise. The energy management system interface may be configured to provide the second message to a router. In addition, the energy management system interface may be further configured to provide the second message to a second domain member of a second domain including at least one second endpoint addressed by the query. Furthermore, a subset of the set of qualifiers may address the query to the at least one first endpoint and the at least one second endpoint. This subset may include a domain name qualifier with a value including a wildcard.

In the gateway, the energy management system interface may be further configured to receive a third message from the first domain member, the third message structured according to the energy management protocol and translate the third message into a fourth message structured according to the industrial protocol. The BMS interface may be further configured to receive the first message from an external entity and provide the fourth message to the external entity. The energy management system interface and the BMS interface may execute synchronously or asynchronously. The BMS interface may be configured to receive the first message from a BMS controller and provide the fourth message to the BMS controller.

According to another aspect, a method of facilitating communication between devices using a computer system is provided. The method includes acts of receiving, by the computer system, a first message, the first message being structured according to an industrial protocol; translating, by the computer system, the first message into a second message structured according to an energy management protocol different from the industrial protocol, the second message including a query comprising at least one command and a set of qualifiers, the query being addressed to at least one first endpoint and including at least one of a sum command and a set command; and providing, by the computer system, the second message to a first domain member of a first domain including the at least one first endpoint, the first domain member being a device other than the at least one first endpoint.

In the method, the act of receiving, by the computer system, the first message may include an act of receiving a message structured according to the MODBUS protocol. The act of translating, by the computer system, the first message into the second message may include an act of translating a message into the EnergyWise protocol. The act of providing, by the computer system, the second message to the first domain member may include an act of providing the second message to a router.

The method may further include an act of providing the second message to a second domain member of a second domain including at least one second endpoint addressed by the query. In the method, the act of translating, by the computer system, the first message into the second message may includes addressing the query to the at least one first endpoint and the at least one second endpoint. The act of addressing the query may include an act of assigning wildcard to a domain name qualifier. The act of receiving, by the computer system, the first message may include an act of receiving the first message from an external entity and the method may further include acts of receiving a third message from the first domain member, the third message structured according to the energy management protocol; translating the third message into a fourth message structured according to the industrial protocol; and providing the fourth message to the external entity. The act of receiving the first message from the external entity may include an act of receiving the first message from a BMS controller.

According to another aspect, a non-transitory computer readable medium is provided. The computer readable medium stores sequences of instruction for facilitating communication between devices using a computer system. The sequences of instruction include instructions that will cause at least one processor to receive a first message structured according to an industrial protocol; translate the first message into a second message structured according to an energy management protocol different from the industrial protocol, the second message including a query comprising at least one command and a set of qualifiers, the query being addressed to at least one first endpoint and including at least one of a sum command and a set command; and provide the second message to a first domain member of a first domain including the at least one first endpoint, the first domain member being a device other than the at least one first endpoint. The non-transitory computer readable medium may further include instructions that will cause the at least one processor to receive the first message using the MODBUS protocol and translate the first message into a second message structured according to the EnergyWise protocol.

Still other aspects, examples and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example. References to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of any particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Aspects and examples disclosed herein provide processes and apparatus by which a building management system monitors and controls the power state of various managed information technology devices. Examples of these managed devices include voice over internet protocol telephones, fax machines, computer systems, webcams, Power Over Ethernet devices and the like. Some aspects and examples described herein implement an energy management gateway through which a building management system monitors and controls power usage of devices that communicate data with one another via a network. In at least one example, the energy management gateway communicates with CISCO brand devices via the CISCO EnergyWise protocol, version 2. CISCO devices and specifications for the CISCO EnergyWise protocol are available from Cisco Systems, Inc. of San Jose, Calif.

Examples of the methods and apparatus discussed herein are not limited in application to the details of construction and the arrangement of components set forth in the following description or illustrated in the accompanying drawings. The methods and apparatus are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Energy Management System

Figure 1:
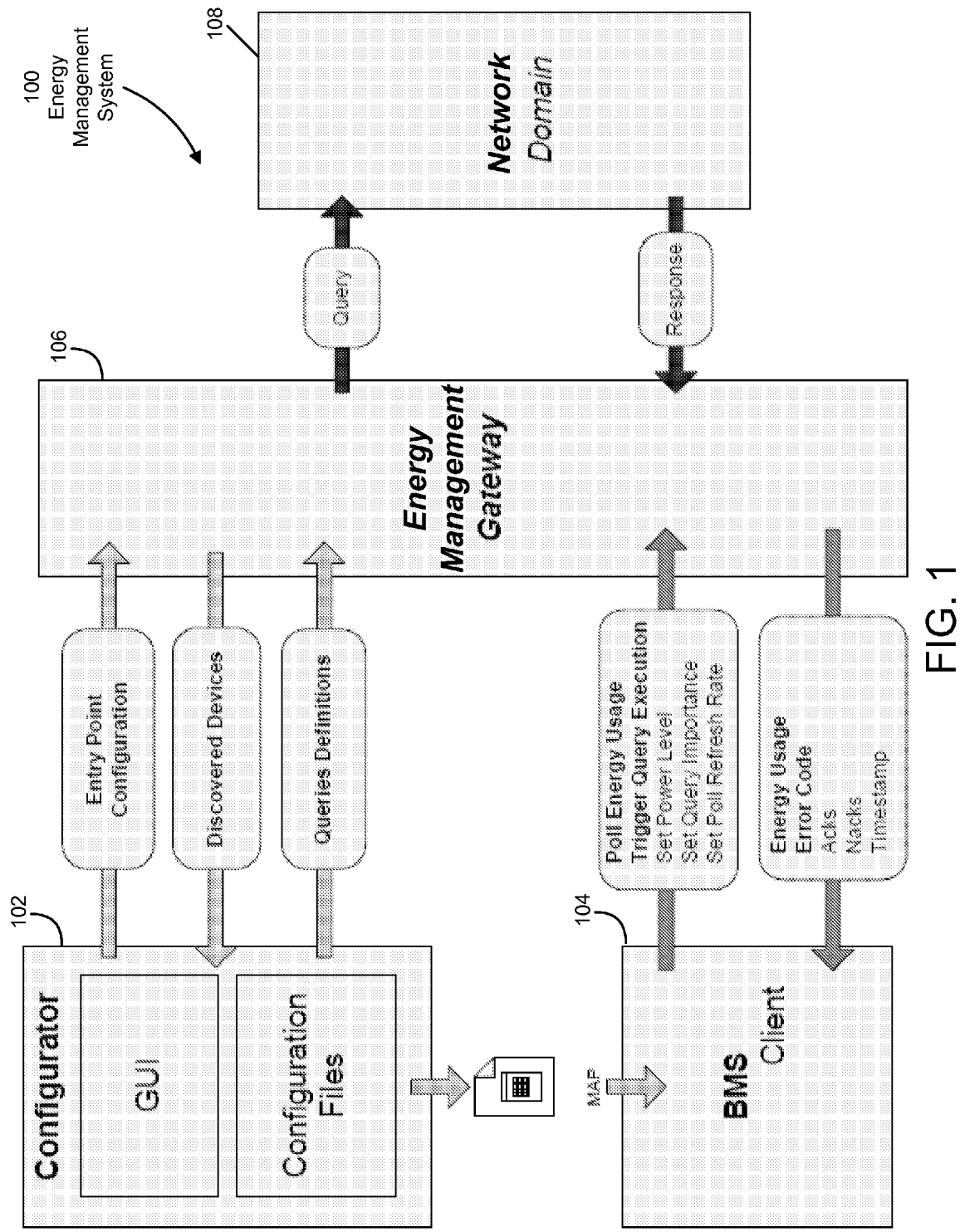
FIG. 1 is a schematic diagram of one example of an energy management system.

Various examples implement an energy management system on one or more computer systems. FIG. 1 illustrates one of these examples, an energy management system 100. As shown in FIG. 1, the energy management system 100 includes a configurator 102, a building management system (BMS) client 104, an energy management gateway 106 and a network domain 108. Also as shown in FIG. 1, the configurator 102 exchanges (i.e. sends or receives) configuration information with the BMS client 104 and the energy management gateway 106. The BMS client 104 exchanges energy management information with the energy management gateway 106. The energy management gateway 106, in turn, exchanges queries and responses with the network domain 108. The network domain 108 includes one or more managed devices that the BMS client 104 monitors and controls via the energy management gateway 106. Each of these interactions is described further below.

Each of the components shown in FIG. 1 may be implemented using one or more computer systems that are in data communication with one another via a network. This network may include any communication network through which computer systems may exchange information. For example, the network may be a public network, such as the internet, and may include other public or private networks such as LANs, WANs, extranets and intranets.

In one example, components 102, 104 and 106 each reside on a separate and physically discrete computer system. However, examples are not limited to this configuration. In other examples, each of the components 102, 104 and 106 reside within a single computer system.

Information may flow between each of the components in FIG. 1, or any of the elements, components and subsystems disclosed herein, using a variety of techniques. Such techniques include, for example, passing the information over a network using standard protocols, such as TCP/IP, passing the information between modules in memory and passing the information by writing to a file, database, data store, or some other non-volatile data storage device. For instance, in one example, the energy management gateway 106 communicates with the network domain 108 via a wireless interface. In addition, pointers or other references to information may be transmitted and received in place of, or in addition to, copies of the information. Conversely, the information may be exchanged in place of, or in addition to, pointers or other references to the information. Other techniques and protocols for communicating information may be used without departing from the scope of the examples disclosed herein.

The configurator 102 illustrated in FIG. 1 implements a user interface through which the configurator 102 exchanges a variety of configuration information with a user. In at least one example, the user interface of the configurator 102 is browser-based and is implemented using an embedded web server. The configuration information exchanged through the user interface may include parameters that specify entry points into the network domain 108, identifiers of the managed devices within the network domain 108, or queries executed by the managed devices. Entry points are network devices resident within the network domain through which the energy management gateway 106 provides queries addressed to the managed devices. Entry points propagate these queries to managed devices. In at least one example, the managed devices that reside within the network domain 108 include devices other than the entry points.

In some examples, the user interface of the configurator 102 presents elements through which the configurator 102 receives parameters defining queries executed by the managed devices. These parameters may specify a particular query, associate the query with one or more domains or subset of managed devices, and define a schedule by which the query is to be repeatedly executed. In several examples, the user interface displays a list of managed devices and receives query information for one or more of the managed devices displayed within the list. This query information may define one or more queries. In one example, prior to displaying the list of managed devices, the configurator 102 generates the list from a list of managed devices received from the energy management gateway 106. In another example, the configurator 102 generates the list from information contained within an offline commissioning data storage device, such as a pre-populated text file or a CISCO LMS database.

When issued to an entry point, queries generated from the query information provided by the configurator 102 cause devices within the network domain 108 to perform any of several actions. For instance, a "set" query causes one or more network devices within the network domain 108 to propagate the set query to a subset of the managed devices. In one example, the subset is specified by values of one or more arguments of the query. Each member of the subset that receives and executes the propagated set query alters its power consumption based on a value of an argument included in the query.

According to another example, a "collect" query causes one or more network devices within the network domain to propagate the collect query to a subset of the managed devices. As with the sum query, in one example, the subset is specified by one or more arguments of the query. Each of the subset of managed devices that receives and executes the propagated collect query responds to the query with information representative of the power usage of the device.

In still another example, a "sum" query causes one or more network devices within the network domain to propagate the sum query to a subset of the managed devices. This subset, too, may be specified by one or more arguments of the query. Each of the subset of managed devices that receives and executes the propagated sum query provides information representative of the power usage of the managed device to a network device. The network devices, in turn, calculate a statistical summary, such as a sum or average, of the power usage information provided by the managed devices, and respond to the sum query with the statistical summary.

In other examples, the user interface of the configurator 102 presents information descriptive of the configuration and operational activities previously conducted by the energy management gateway 106. For instance, in some examples, the user interface of the configurator 102 provides elements through which the configurator receives requests to export configuration information to another computer system. Upon receipt of such a request, the configurator 102 saves a copy of the requested configuration information to a default data storage device or to a data storage device specified in the request.

In other examples, the configurator 102 receives a file generated by the energy management gateway 106 that includes a log of the configuration and operational activities executed by the energy management gateway 106. This log file may be stored in a variety of formats including plain text, csv and json. In these examples, responsive to receiving a request from a user, the user interface of the configurator 102 opens, loads and displays the contents of the log file to the user. In some examples, the user interface of the configurator 102 accesses the log file while the file remains resident on the energy management gateway 106. Further, in some examples, the user interface of the configurator 102 downloads or prints the log file upon receipt of a request to do so from a user. In other examples, the configurator 102 receives multiple log files generated by multiple energy management gateways.

The configurator 102 also implements a system interface through which the configurator 102 exchanges configuration information with the BMS client 104 and the energy management gateway 106. As shown in FIG. 1, the configuration information exchanged between the configurator 102 and the energy management gateway 106 includes parameters that specify the entry points, identifiers and queries described above. In one example, the configuration information exchanged between the configurator 102 and the energy management gateway 106 also includes instructions that will cause the gateway 106 to start, stop or restart operation.

The configuration information exchanged between the configurator 102 and the BMS client 104 includes any information required by the BMS client 104 to interoperate with the energy management gateway 106. As shown in FIG. 1, this information includes a map of valid values for query arguments that the BMS client 104 may use to request execution of queries. As those described above, query arguments control the scope and content of the processing initiated via the queries.

Utilizing the map of query argument values, the BMS client 104 monitors and controls the power usage of the managed devices via the energy management gateway 106. The BMS client 104 may alter the power usage of the managed device in response to any of several events. For instance, in some examples, the BMS client 104 monitors the power usage of the managed devices and issues commands to decrease consumption in response to the power usage of the managed devices transgressing a threshold. In other examples, the BMS client 104 monitors security devices within a building and issues commands to increase consumption in response to detecting the presence of a tenant, such as via a door contact sensor or swiping of a security badge. In other examples, the BMS client 104 issues commands to adjust power consumption in response to a predetermined schedule, such as based on time of day, day of week or day in year, to control resource utilization during off-peak periods.

As illustrated in FIG. 1, the BMS client 104 implements a system interface through which the BMS client 104 exchanges energy management information with the energy management gateway 106. Some of this energy management information is used by the energy management gateway 106 to monitor and control the managed devices. Examples of this information include data representative of the power levels to be adopted by the managed devices, a subset of managed devices targeted for a particular query and a time interval that transpires between successive executions of a particular query. Other examples of the energy management information include data useful for troubleshooting problem queries. Examples of this information include a timestamp indicating when a particular query was last successfully executed, the number of managed devices that acknowledged execution of a particular query and the number of managed devices that negatively acknowledged execution of a particular query. According to some examples, the BMS client 104 implements another system interface through which the BMS client 104 shares the energy management information with one or more building management system workstation applications. In these examples, the building management system workstation applications provide a user interface through which the building management system workstation applications receive configuration information that controls the behavior of the managed devices along with the other subsystems that are under the control of the building management system.

As shown in FIG. 1, the energy management gateway 106 implements a system interface through which the energy management gateway 106 exchanges configuration information with the configurator 102, energy management information with the BMS client 104 and query information with the network domain 108. According to various examples, the energy management gateway 106 implements these system interfaces utilizing a variety of communication protocols. For instance, in one example, the energy management gateway 106 communicates with the configurator 102 using an IP protocol, communicates with the BMS client 104 using a MODBUS protocol, such as MODBUS version V1.1b available from the Modbus Organization, Inc. of Hopkinton, Mass., and communicates with the network domain 108 using an EnergyWise protocol. In another example, the energy management gateway 106 communicates with the BMS client 104 using web services in addition to, or instead of, the MODBUS protocol.

Upon receipt of configuration information from the configurator 102, the energy management gateway 106 stores the configuration information in a local data storage device and initializes its operation using parameters contained within the configuration information. The operational parameters included in the configuration information specify the addresses of the entry points to the network domain 108 and the queries that may be issued to the entry points. In one example, as part of this configuration and initialization process, the energy management gateway 106 opens a log file and stores in the log file results (including acknowledgments, errors and warnings) of its configuration and operational processes. As discussed above, the energy management gateway 106 may provide this log file to the configurator 102, which may, in turn, display the logged results to a user.

In another example, as part of this configuration and initialization process, the energy management gateway 106 queries the network domain 108 to identify managed devices within the network domain 108, generates a list of the managed devices and provides the list to the configurator 102. As discussed above, the configurator 102 may display this list to a user during execution of its query configuration activities. Thus, in this example, the configuration information is received in two portions, the first portion including parameters that enable the energy management gateway 106 to discover the managed devices included in the network domain 108 via its entry points, and the second portion including parameters that allow the energy management gateway 106 to configure queries.

According to a number of examples, after the configuration and initialization process is complete, the energy management gateway 106 enters a listening state. In some examples, the energy management gateway 106 configures and issues a query to the network domain 108 via one or more entry points responsive to receipt of a request for energy management information from the BMS client 104. In these examples, after receiving a response to the query from the one or more entry points, the energy management gateway 106 provides information representative of the arguments and results of the query, for example energy usage values and error codes, via a result returned to the BMS client 104. In other examples, the energy management gateway 106 configures and issues queries asynchronously from receipt of energy management information from the BMS client 104. For instance, in some of these examples, the energy management gateway 106 configures and issues queries according to a predefined schedule and stores the results of the queries in local storage. In these examples, the energy management gateway 106 responds to queries for information gathered according to the predefined schedule by providing the results of the most recently executed scheduled query. Additional exemplary processes executed by the energy management gateway 106 are described further below with reference to FIGS. 5-8.

Some examples of the energy management gateway 106 include additional security features. In one example, the energy management gateway 106 accepts queries only from BMS clients transmitting from a previously recorded and authorized IP address. In another example, the energy management gateway 106 includes multiple physical network connections to separate the BMS client 104 from the network domain 108. In some examples, the energy management gateway 106 is keyed to a serial number of the processor or hard drive, thereby preventing execution of the energy management gateway 106 on an unauthorized system.

Other examples of the energy management gateway 106 are manufactured within a physical footprint that enables the energy management gateway 106 to be deployed on a wall mount, DIN rail mount or a rack mount. In addition, some examples of the energy management gateway 106 include an external data storage device for accumulating energy data.

As shown in FIG. 1, the network domain 108 includes managed devices, network devices and specialized network devices referred to as entry points. Entry points are in data communication with the energy management gateway 106. Entry points receive queries directed to the managed devices located within the network domain 108 and provide responses to the queries after execution of the queries by the network devices and managed devices.

While FIG. 1 depicts a single network domain 108, the energy management gateway 106 is not limited to communicating with a single network domain. In some examples, the energy management gateway 106 communicates with multiple domains. In these examples, the energy management gateway 106 can issue a single query to multiple domains by sequentially issuing the query to entry points of each domain with one or more managed devices that are targeted by the query. In another example, the energy management gateway 106 is architected using a multi-threaded model that allows the energy management gateway 106 to implement multiple, concurrent threads to execute queries, respond to energy management information received from the BMS client 104, or for other processing purposes. When executing queries, each thread controls execution of a single query to one or more network domains. Using a multi-threaded approach, the energy management gateway 106 can query multiple network domains concurrently.

Figure 2A:
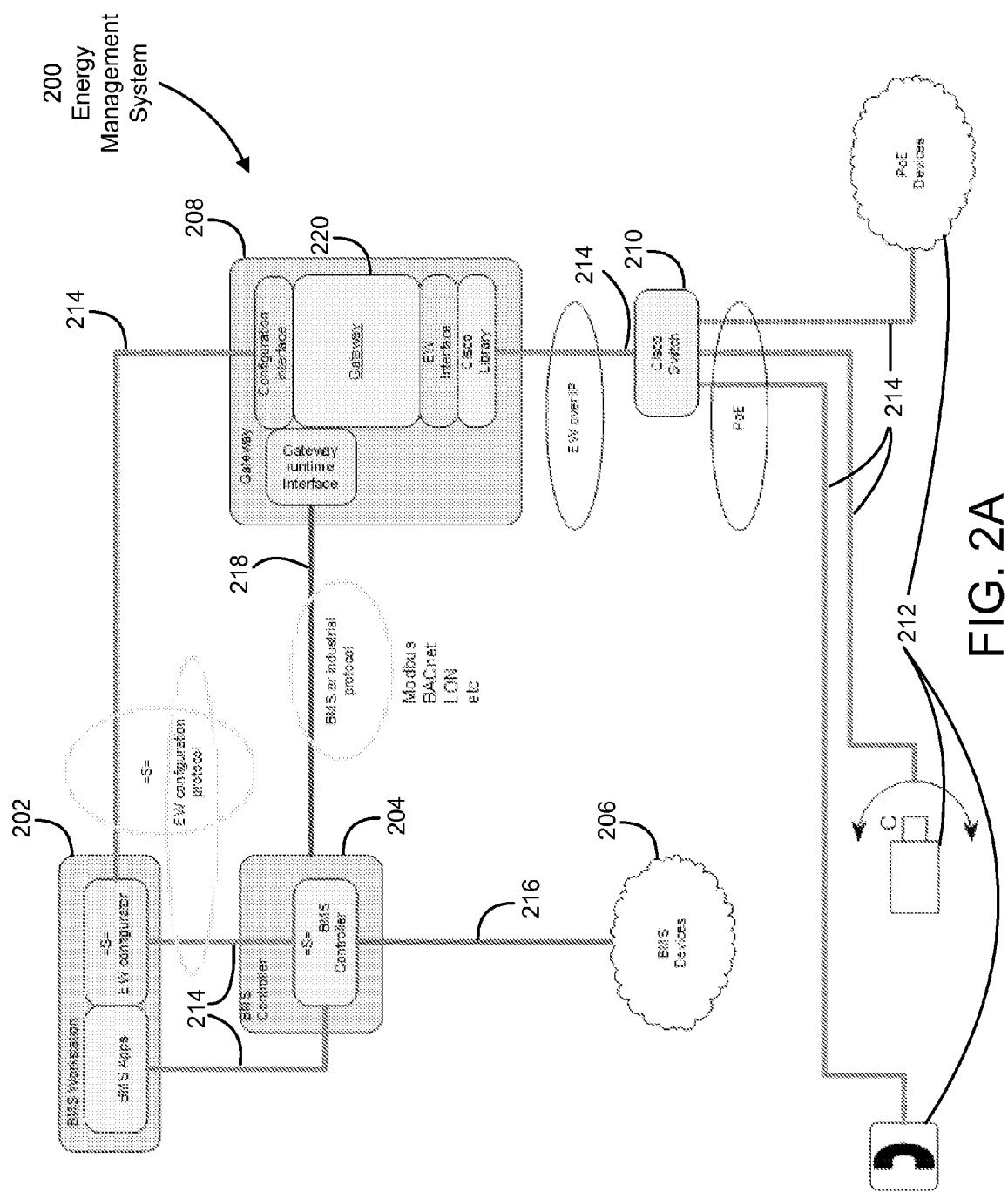
FIG. 2A is another schematic diagram of an example of an energy management system.

Examples of energy management systems are not limited to the particular configuration illustrated in FIG. 1. Various examples utilize a variety of hardware components, software components and combinations of hardware and software components configured to perform the processes and functions described herein. In some examples, the energy management system is implemented using a distributed computer system, such as the distributed computer system described further below with regard to FIG. 4. FIG. 2A illustrates one such example that includes an energy management system 200.

As shown in FIG. 2A, the energy management system 200 includes a BMS workstation 202, a BMS controller 204, BMS devices 206, a gateway 208, a CISCO switch 210, endpoints 212, an IP network 214, a BMS network 216 and another network 218. The BMS workstation 202 implements a set of BMS configuration and management applications and an EW configurator. The BMS controller 204 implements a BMS controller component. The gateway 208 implements a configuration interface, a gateway runtime interface, a gateway component 220, an EW interface and a CISCO library. In this example, the BMS workstation 202, the BMS controller 204, the gateway 208 and the CISCO switch 210 are implemented using one or more computer systems, such the computer systems discussed further below with reference to FIG. 4. Each of the networks 214, 216 and 218 includes a physical bus and other physical layer components required to support its designated protocol.

The EW configurator shown in FIG. 2A is a configurator, such as the configurator 102, that further configures the BMS controller 204 and the gateway 208 to provide energy management functionality using the CISCO EnergyWise protocol. The EW configurator implements a user interface through which the EW configurator receives EnergyWise queries that collect energy management information and set power levels of endpoints. As shown in FIG. 2A, both the BMS applications and the EW configurator communicate with the BMS controller resident on the BMS controller 204 using the IP network 214. In at least one example, the EW configurator configures the BMS controller to utilize the gateway 208 via a map, such as the map of valid values for query arguments described above with reference to FIG. 1.

The EnergyWise queries received by the EW configurator illustrated in FIG. 2A each include a command and a set of associated arguments, which are also referred to as "qualifiers." The qualifiers enable selection of a subset of the endpoints for command execution. The available commands include the set, sum and collect commands. The available qualifiers for these commands include domain, node name, role, device type, keywords and importance qualifiers. The domain qualifier specifies the name of a logical grouping of endpoints. Each endpoint belongs to a single domain. The node name qualifier identifies a specific node or domain member. The role qualifier groups endpoints by the user type or the functional type of the endpoint. Example values for the roles qualifier include "executive," "support staff" and "IT." The device type qualifier groups endpoints by functional type. Example values for the device type qualifier include "phone" and "copier." In some examples, the device type qualifier is replaced by a category qualifier. Example values for the category qualifier include "Consumer," "Producer" and "Meter." The category qualifier may include one or more of these enumerated values. The keywords qualifier groups endpoints by an arbitrary string. The importance qualifier groups endpoints by level of importance to a facility. Endpoints with an importance that is less than or equal to the value specified within a query will execute the command included in the query. For example, the following EnergyWise query would turn off all the phones in Building 2 that have an importance value of 20 or less: "Importance=20, Name=bldg2, Role=phone, Set Level 0."

In one example, the EW configurator illustrated in FIG. 2A supports wildcard characters within the specified values of one or more qualifiers. For instance, in one example, upon receipt of an indication that a user wishes to include a wildcard character within the value of a node name qualifier or a role qualifier, the EW configurator configures an EnergyWise query that includes a qualifier value with the wildcard character. In another example, upon receipt of an indication that a user wishes to include a wildcard character with the value of a domain qualifier, device type qualifier, or keyword qualifier, the EW configurator configures an EnergyWise query that includes qualifier values with the wildcard character.

The BMS controller shown in FIG. 2A is a BMS client, such as the BMS client 104, that further interacts with the gateway 208 to control the endpoints 212. The endpoints 212 are managed devices that support the CISCO EnergyWise protocol. Once configured, the BMS controller monitors and controls the operations of the BMS devices 206, via the BMS network 216, and the endpoints 212, via the network 218. As shown in FIG. 2A, the network 218 may support any of a variety of BMS or industrial protocols, such as MODBUS, BACnet, LON, etc.

The gateway 208 illustrated in FIG. 2A is an energy management gateway, such as the energy management gateway 106, that further facilitates interoperation of the BMS controller 204 and the endpoints 212 using the CISCO EnergyWise protocol. As shown in FIG. 2A, the gateway 208 implements the configuration interface to exchange configuration information with the BMS workstation 202 via the IP network 214. The gateway 208 configures itself for operation using the configuration information received from the BMS workstation 202. The configuration activity includes generation of one or more EnergyWise queries as specified in the configuration information.

The gateway 208 also implements the gateway runtime interface to exchange energy management information with the BMS controller 204. Upon receipt of energy management information from the BMS controller 204, the gateway runtime interface parses the energy management information and stores the parsed energy management information within a data storage device included within the gateway component 220. This data storage device is shared by the gateway runtime interface and the EW interface. In at least one example described further below with reference to FIG. 2B, the shared data storage device enables the gateway runtime interface and the EW interface to execute asynchronously.

Continuing the example shown in FIG. 2A, the EW interface retrieves the parsed information and converts queries and query arguments represented by the parsed information into one or more EnergyWise queries that contain one or more qualifiers. Next, the EW interface utilizes the CISCO library to issue the one or more EnergyWise queries to the CISCO switch 210 via the IP network 214. The CISCO switch 210 is an entry point into a network domain, such as the network domain 108, that includes the endpoints 212. The CISCO switch 210 propagates the one or more EnergyWise queries to the endpoints 212. As shown in FIG. 2A, some of the endpoints 212 natively support the EnergyWise protocol while others support Power Over Ethernet but do not support the EnergyWise protocol. Queries directed to devices that do not support the EnergyWise protocol are processed by the CISCO switch 210. Query responses are processed in the opposite manner, i.e. received by the CISCO switch 210, provided to the EW interface via the CISCO library, provided to the gateway component 220, provided to the gateway runtime interface and, finally, provided to the BMS controller 204. In some examples, Additional exemplary processes executed by the gateway 208 are described further below with reference to FIGS. 5-8.

Figure 2B:
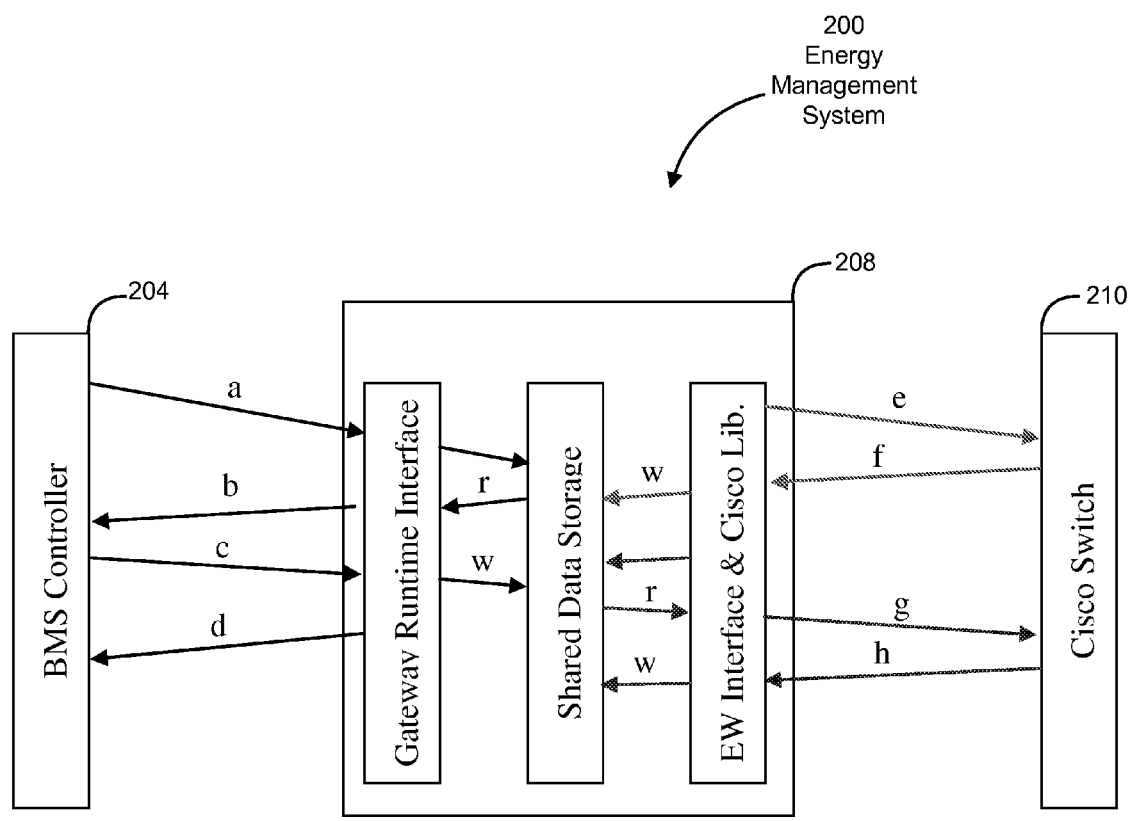
FIG. 2B is another schematic diagram of an example of an energy management system.

FIG. 2B illustrates another example of the gateway 208 in which the shared data storage device described above with reference to FIG. 2A enables the gateway runtime interface to run asynchronously from the EW interface. In FIG. 2B, the arrows a, b, c and d represent industrial protocol communications between the BMS controller 204 and the gateway runtime interface. The arrows e, f, g and h represent EnergyWise communications between the EW interface, which utilizes the CISCO Library described above, and the CISCO switch 210.

According to one example, the BMS controller 204 communicates energy management information to the gateway runtime interface that includes a query requesting energy usage data for endpoints running within the network domain. This communication is illustrated by the arrow a. The gateway runtime interface receives the communication and retrieves, from the shared data storage device, information representative of the energy usage data requested by the query. Next, as illustrated by the arrow b, the gateway runtime interface sends a response that includes the information representative of the energy usage data to the BMS controller 204.

According to another example, the BMS controller 204 communicates energy management information to the gateway runtime interface that includes a query execution request. This communication is illustrated by the arrow c. In response to receiving the query execution request, the gateway runtime interface writes the request to the shared data storage device. Next, as illustrated by the arrow d, the gateway runtime interface sends a response that acknowledges receipt and storage of the query execution request.

Continuing this example, at some future point in time, the EW interface scans the shared data storage device for query execution requests and retrieves the query execution requested stored therein. Next, as illustrated by the arrow g, the EW interface issues an EnergyWise query. After the EnergyWise query has been processed, the CISCO switch 210 responds to the EnergyWise query. This response is illustrated by the arrow h. After receiving the response, the EW interface writes the results of the query to the shared data storage device.

According to another example, the EW interface executes an unsolicited EnergyWise query according to a predetermined schedule. In this example, as illustrated by the arrow e, the EW interface periodically issues an EnergyWise query. After the EnergyWise query has been processed, the CISCO switch 210 responds to the EnergyWise query. This response is illustrated by the arrow f. After receiving the response, the EW interface writes the results of the query to the shared data storage device.

It is to be appreciated that according to these examples, the communications between the BMS controller 204 and the gateway runtime interface and the communications between the EW interface and the CISCO switch 210 are logically separated and completely asynchronous. In addition, the EW interface can execute queries on a scheduled basis and store the results in the shared data storage device, regardless of when or if the BMS controller has requested one or more queries. Further, when the BMS controller 204 requests data via the gateway runtime interface, the gateway runtime interface provides energy management information representative of the query results stored in the shared data storage device. This energy management information includes a timestamp indicating when the results of the last successfully executed query were received by the EW interface.

While the examples described above with reference to FIG. 2B illustrate asynchronous execution between the gateway runtime interface and the EW interface, examples are not limited only to asynchronous execution of these components. In another example, the gateway runtime interface and the EW interface execute in a synchronous mode. According to this example, the gateway runtime interface receives energy management information from the BMS controller that includes a request for synchronous execution of a query. For instance, the energy management information may include a flag indicating synchronous execution is requested for the embedded query, or the energy management information may include a request type that the gateway runtime interface is configured to execute synchronously. Responsive to receiving this request, the gateway runtime interface stores a query execution request in the shared data storage device, but awaits results for the execution of the corresponding EnergyWise query or queries prior to responding to the BMS controller with the results of the corresponding EnergyWise query or queries.

Figure 3:
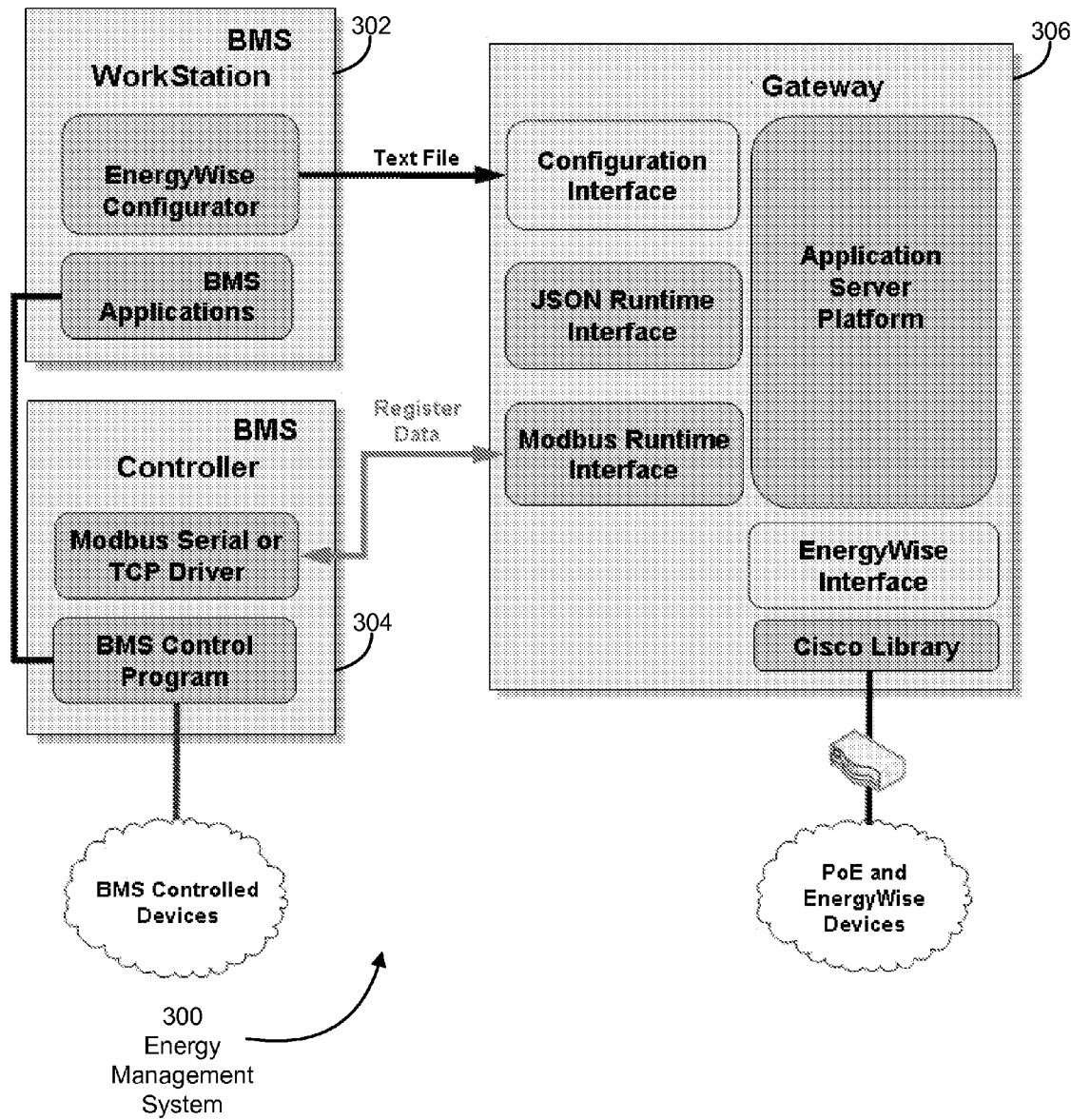
FIG. 3 is another schematic diagram of one example of an energy management system.

FIG. 3 illustrates another example of an energy management system, the energy management system 300. As shown in FIG. 3, the energy management system 300 includes a BMS workstation 302, a BMS controller 304, and a gateway 306. The BMS workstation 302 implements an EnergyWise Configurator and a set of BMS applications. The BMS controller 304 implements a MODBUS serial or TCP driver and a BMS control program. The gateway 306 implements a configuration interface, a JSON runtime interface, a MODBUS runtime interface, an application server platform, an EnergyWise interface and a CISCO library. In this example, the BMS workstation 302, the BMS controller 304 and the gateway 306 are implemented using one or more computer systems, such the computer systems discussed further below with reference to FIG. 4. In at least one example, the gateway 306 is implemented using a relatively low-cost Linux-based computer system.

In the example illustrated in FIG. 3, the combination of the BMS workstation 302, the BMS controller 304 and the gateway 306, perform the role of a Management Station as defined within the EnergyWise paradigm. The EnergyWise configurator shown in FIG. 3 is a configurator, such as the configurators referenced in FIGS. 1 and 2, that further generates one or more text files that embody the configuration information needed to setup the BMS controller 304 and the gateway 306 for operation. Like the configurators previously described, the EnergyWise configurator illustrated in FIG. 3 provides a user interface through which the BMS workstation 302 receives configuration information. This configuration information may include gateway IP configuration information, address information for the entry points to one or more domains, security key information for the one or more domains and EnergyWise queries. Upon receipt of an indication that a user wishes to alter configuration information of a previously configured gateway, the user interface of the EnergyWise configurator presents an option to protect the MODBUS registers already created to avoid laborious recommissioning of MODBUS clients. To distribute the configuration information, the EnergyWise configurator may communicate with the BMS controller 304 and the gateway 306 using any set of IP protocols, such as HTTP, REST, SOAP, FTP, TFTP, Telnet, SSH, etc. Further, in at least one example, the EnergyWise configurator is implemented as a browser based interface served by the web server executing on the gateway 306.

As shown in FIG. 3, the MODBUS Serial or TCP driver exchanges energy management information with the gateway 306 by reading and writing MODBUS register data. In one example, this MODBUS register data is defined within a map provided by the EnergyWise configurator. The map may be stored in a variety of formats including JSON, csv and pdf. The BMS controller 304 uses energy management information received via the MODBUS Serial or TCP driver to manage all of the managed devices and endpoints under its control.

The gateway 306 illustrated in FIG. 3 is an energy management gateway, such as either of the energy management gateways 106 or 208, that further includes a JSON runtime interface and a MODBUS runtime interface. The gateway 306 executes the JSON interface to parse and manipulate the one or more text files embodying the configuration information received from the EnergyWise configurator resident on the BMS workstation 302. The gateway 306 executes the MODBUS runtime interface to exchange information with the MODBUS serial or TCP driver resident on the BMS controller 304. Additional exemplary processes executed by the gateway 306 are described further below with reference to FIGS. 5-8.

One example of a JSON global configuration file follows:

```
{
    "GatewayConfiguration":{
    //gateway IP configuration parameters
    "Hostname": "LabPhoneGateway",
    "IPAddress": "10.158.23.100", // or "DHCP"
    "SubnetMask": "255.255.255.0", // ignore if "DHCP"
    "DefaultGateway": "10.158.23.1", // ignore if "DHCP"
    //default queries parameters
    "Importance": "70", // 0 - 100
    "RefreshRate": "60" // optional / 0-65535 seconds
```

```
    },
    "DomainsConfiguration":{
    // see next section
    }
}
```

This example configuration file defines the gateway IP parameters and the MODBUS addresses in Table 1. As describe above, the BMS controller 304 may utilize these MODBUS addresses to exchange information with the gateway 306.

TABLE 1

| Register Name | | Access | Description |
|---|---|---|---|
| 40001 | GHS | R | Error code reporting the Gateway health status<br>0 = HEALTHY<br>1 = Communication Fault<br>2 = Service Not Running<br>3 = HW/SW Failure<br>Remaining values reserved. |
| 40002 | GIMP | RW | This register exposes the default queries importance for the BMS to read and modify it. |
| 40003 | GRR | RW | This register exposes the default queries refresh rate for the BMS to read and modify it. |

One example of a JSON domain configuration file follows:

```
{
    "DomainsConfiguration":{
    //EnergyWise Domains Configuration
    "Domain":{
    //domain entrypoint configuration
        "DomainName": "OfficeNetwork",
        "EntryPointIP": "10.158.3.1",
        "SecretKey":"cisco", // secret shared key
        "Port": "43292", // optional (use default)
    //default queries parameters
        "Importance":"80", // Default Importance - inherited if missing
        "RefreshRate":"60", // Default Refresh Rate (secs) - inherited if missing
    },
    "Domain":{
        "DomainName": "LabNetwork",
        "EntryPointIP ": "10.158.4.1",
        "SecretKey":"cisco", // secret shared key
        "Port": "43292", // optional (use default)
        "Importance":"70", // Default Importance - inherited if missing
        "RefreshRate":"30", // Default Refresh Rate (secs) - inherited if missing
    }
}
```

This example configuration file defines the domain configuration and the MODBUS addresses in Table 2. As describe above, the BMS controller 304 may utilize these MODBUS addresses to exchange information with the gateway 306.

TABLE 2

| Register Name | | Access | Description |
|---|---|---|---|
| 40004 | DHS "OfficeNetwork" | R | Error code reporting the Domain status<br>0 = HEALTHY |

TABLE 2-continued

| Register | Name | Access | Description |
|---|---|---|---|
| | | | 1 = Communication Fault<br>Remaining values reserved. |
| 40005 | DIMP<br>"OfficeNetwork" | RW | This register exposes the default queries importance for the BMS to read and modify it. |
| 40006 | DRR<br>"OfficeNetwork" | RW | This register exposes the default queries refresh rate for the BMS to read and modify it. |
| 40007 | DHS<br>"LabNetwork" | R | Error code reporting the Gateway health status<br>0 = HEALTHY<br>1 = Communication Fault<br>Remaining values reserved. |
| 40008 | DIMP<br>"LabNetwork" | RW | This register exposes the default queries importance for the BMS to read and modify it. |
| 40009 | DRR<br>"LabNetwork" | RW | This register exposes the default queries refresh rate for the BMS to read and modify it. |

One example of a JSON query configuration file follows:

```
{
//EnergyWise Queries Configuration
    "Query1":{
    //Sum query definition
        "Type":"Sum", // "Sum" or "Set"
        "DomainName": "OfficeNetwork",
        "NodeName": "Core2",
        "RoleName": "Manager",
        "DeviceType": null, // Device Type or empty or null
        "KeyWords": "Administration,Security", // comma separated keywords
        "Importance": "70", // inherited if missing
        "RefreshRate": "60", // inherited if missing
    },
    "Query2":{
    //Set query definition
        "Type":"Set", // "Sum" or "Set"
        "DomainName": "LabNetwork",
        "NodeName": "Lab",
        "RoleName": "IT", // Optional | Name | null
        "DeviceType": "Phone", // Device Type or empty or null
        "KeyWords": "Security", // Optional | comma separated keywords
        "Importance": "70", // Optional - inherited if missing
    }
}
```

This example configuration file defines EnergyWise queries in the gateway and the MODBUS addresses in Table 3. As describe above, the BMS controller 304 may utilize these MODBUS addresses to exchange information with the gateway 306.

TABLE 3

| Register | Name | Access | Description |
|---|---|---|---|
| 40010 | CTL<br>"Query1" | RW | Query Control Register<br>0 = Executed successfully<br>1 = Trigger Execution<br>2 = Busy/Executing<br>3 = Execution Failed<br>Remaining values reserved. |
| 40011 | PKW<br>"Query1" | R | Energy usage: Kilowatt |
| 40012 | PW<br>"Query1" | R | Energy usage: Watt |
| 40013 | PMW<br>"Query1" | R | Energy usage: mWatt |
| 40014 | LEV | RW | Power Level/0-10 - Not used in Query1 |

TABLE 3-continued

| Register | Name | Access | Description |
|---|---|---|---|
| 40015 | TSYM<br>"Query1" | R | Last query execution timestamp: YYMM |
| 40016 | TSDH<br>"Query1" | R | Last query execution timestamp: DDhh |
| 40017 | TSMS<br>"Query1" | R | Last query execution timestamp: mmss |
| 40018 | IMP<br>"Query1" | RW | Query Importance 0-100 |
| 40019 | RR<br>"Query1" | RW | Query periodic execution rate |
| 40020 | ACKS<br>"Query1" | R | Number of ACKs received |
| 40021 | NACKS<br>"Query1" | R | Number of NACKs received |
| 40022 | CTL<br>"Query2" | RW | Query Control Register<br>0 = Executed successfully<br>1 = Trigger Execution<br>2 = Busy/Executing<br>3 = Execution Failed<br>Remaining values reserved. |
| 40023 | PKW | R | Energy usage: Kilowatt - Not used in Query2 |
| 40024 | PW | R | Energy usage: Watt - Not used in Query2 |
| 40025 | PMW | R | Energy usage: mWatt - Not used in Query2 |
| 40026 | LEV<br>"Query2" | RW | Power Level/0-10 |
| 40027 | TSYM<br>"Query2" | R | Last query execution timestamp: YYMM |
| 40028 | TSDH<br>"Query2" | R | Last query execution timestamp: DDhh |
| 40029 | TSMS<br>"Query2" | R | Last query execution timestamp: mmss |
| 40030 | IMP<br>"Query2" | RW | Query Importance 0-100 |
| 40031 | RR<br>"Query2" | RW | Query periodic execution rate - Not used in Query2 |
| 40032 | ACKS<br>"Query2" | R | Number of ACKs received |
| 40033 | NACKS<br>"Query2" | R | Number of NACKs received |

In this example, the starting MODBUS register number for Query1 varies based on the MODBUS registers allocated during Domain configuration. Each of MODBUS registers recited in Tables 1-3 is described further below in the MODBUS Registers section. Upon successful completion of the configuration process, the gateway generates the following log file:

```
{
    "Response": 0,
    "ErrorCode": 0
    "ErrorDescription": " "
}
```

Other examples generate log files in a variety of formats including plain text and csv among others.

Information within the energy management systems may be stored in any logical construction capable of holding information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

The interfaces disclosed herein, which include both system interfaces and user interfaces, exchange information with various providers and consumers. These providers and consumers may include any external entity including, among other entities, users and systems. Each of the interfaces disclosed herein may both restrict input to a predefined set of values and validate any information entered prior to using the information or providing the information to other components. Additionally, each of the interfaces disclosed herein may validate the identity of an external entity prior to, or during, interaction with the external entity. For instance, in various examples, a configurator implements role-based configuration privileges with separate password-protected logins for administrators and engineers. These functions may prevent the introduction of erroneous data into the energy management system or unauthorized access to the energy management system.

Computer System

As discussed above with regard to FIGS. 1-3, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 4:
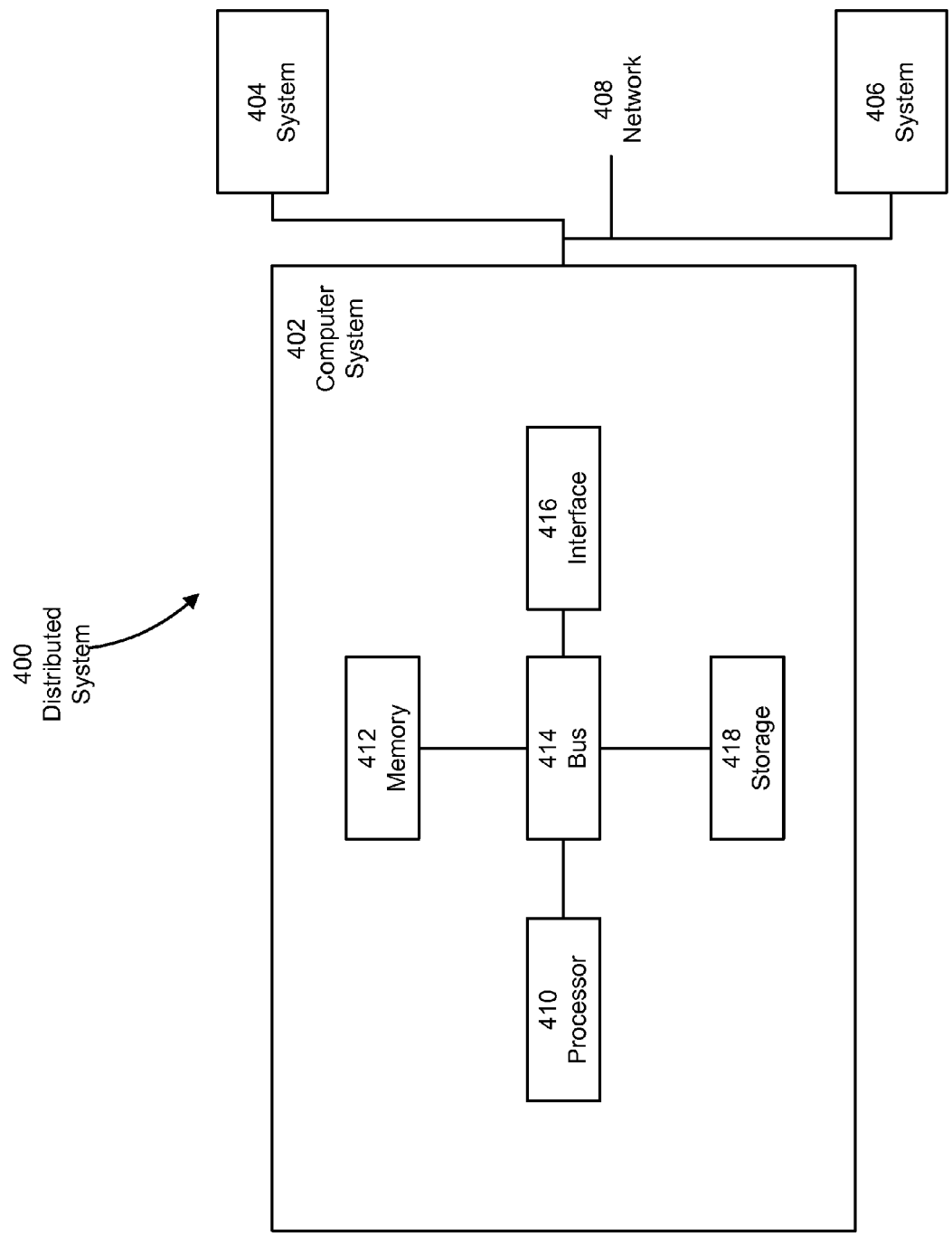
FIG. 4 is a schematic diagram of one example of a computer system that may perform processes and functions disclosed herein.

Referring to FIG. 4, there is illustrated a block diagram of a distributed computer system 400, in which various aspects and functions are practiced. As shown, the distributed computer system 400 includes one more computer systems that exchange information. More specifically, the distributed computer system 400 includes computer systems 402, 404 and 406. As shown, the computer systems 402, 404 and 406 are interconnected by, and may exchange data through, a communication network 408. The network 408 may include any communication network through which computer systems may exchange data. To exchange data using the network 408, the computer systems 402, 404 and 406 and the network 408 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 402, 404 and 406 may transmit data via the network 408 using a variety of security measures including, for example, TLS, SSL or VPN. While the distributed computer system 400 illustrates three networked computer systems, the distributed computer system 400 is not so limited and may include any number of computer systems and computing devices, networked using any medium and communication protocol.

As illustrated in FIG. 4, the computer system 402 includes a processor 410, a memory 412, a bus 414, an interface 416 and data storage device 418. To implement at least some of the aspects, functions and processes disclosed herein, the processor 410 performs a series of instructions that result in manipulated data. The processor 410 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 410 is connected to other system components, including one or more memory devices 412, by the bus 414.

The memory 412 stores programs and data during operation of the computer system 402. Thus, the memory 412 may be a relatively high performance, volatile, random access memory such as a dynamic random access memory (DRAM) or static memory (SRAM). However, the memory 412 may include any device for storing data, such as a disk drive or other non-volatile storage device. Various examples may organize the memory 412 into particularized and, in some cases, unique structures to perform the functions disclosed herein. These data structures may be sized and organized to store values for particular data and types of data.

Components of the computer system 402 are coupled by an interconnection element such as the bus 414. The bus 414 may include one or more physical busses, for example, busses between components that are integrated within a same machine, but may include any communication coupling between system elements including specialized or to standard computing bus technologies such as IDE, SCSI, PCI and InfiniBand. The bus 414 enables communications, such as data and instructions, to be exchanged between system components of the computer system 402.

The computer system 402 also includes one or more interface devices 416 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 402 to exchange information and to communicate with external entities, such as users and other systems.

The data storage device 418 includes a computer readable and writeable nonvolatile, or non-transitory, data storage medium in which instructions are stored that define a program or other object that is executed by the processor 410. The data storage device 418 also may include information that is recorded, on or in, the medium, and that is processed by the processor 410 during execution of the program. More specifically, the information may be stored in one or more data structures specifically configured to conserve storage space or increase data exchange performance. The instructions may be persistently stored as encoded signals, and the instructions may cause the processor 410 to perform any of the functions described herein. The medium may, for example, be optical disk, magnetic disk or flash memory, among others. In operation, the processor 410 or some other controller causes data to be read from the nonvolatile recording medium into another memory, such as the memory 412, that allows for faster access to the information by the processor 410 than does the storage medium included in the data storage device 418. The memory may be located in the data storage device 418 or in the memory 412, however, the processor 410 manipulates the data within the memory, and then copies the data to the storage medium associated with the data storage device 418 after processing is completed. A variety of components may manage data movement between the storage medium and other memory elements and examples are not limited to particular data management components. Further, examples are not limited to a particular memory system or data storage system.

Although the computer system 402 is shown by way of example as one type of computer system upon which various aspects and functions may be practiced, aspects and functions are not limited to being implemented on the computer system 402 as shown in FIG. 4. Various aspects and functions may be practiced on one or more computers having a different architectures or components than that shown in FIG. 4. For instance, the computer system 402 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 402 may be a computer system including an operating system that manages at least a portion of the hardware elements included in the computer system 402. In some examples, a processor or controller, such as the processor 410, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 410 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Energy Management Processes

Figure 5:
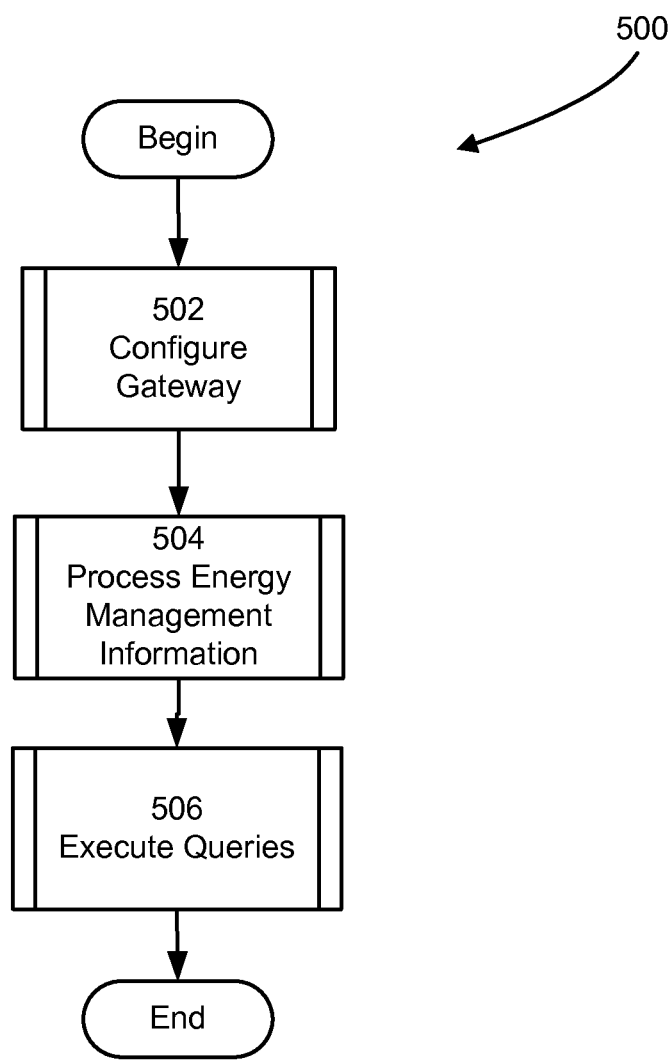
FIG. 5 is a flow diagram depicting a process of facilitating communications between devices.

Some examples perform processes for configuring and implementing an energy management gateway. FIG. 5 illustrates one example of such a process, the process 500. As shown in FIG. 5, the process 500 includes acts of configuring a gateway, processing energy management information and executing queries.

In act 502, a gateway is configured. In one example, an energy management gateway, such as the energy management gateway 106 described above with reference to FIG. 1, configures itself upon receipt of configuration information from a configurator, such as the configurator 102. One example of a process performed in the act 502 is described further below with reference to FIG. 6.

In act 504, energy management information is processed. In at least one example, the energy management gateway 106 processes the energy management information by receiving and responding to queries provided by a BMS client, such as the BMS client 104. One example of a process performed in the act 504 is described further below with reference to FIG. 7.

In act 506, queries are executed. In at least one example, the energy management gateway 106 executes a subset of unsolicited queries independently and asynchronously from other acts and executes another subset of queries in response to receiving requests to do so. One example of a process performed in the act 506 is described further below with reference FIG. 8. The process 500 ends after execution of the act 506.

Figure 6:
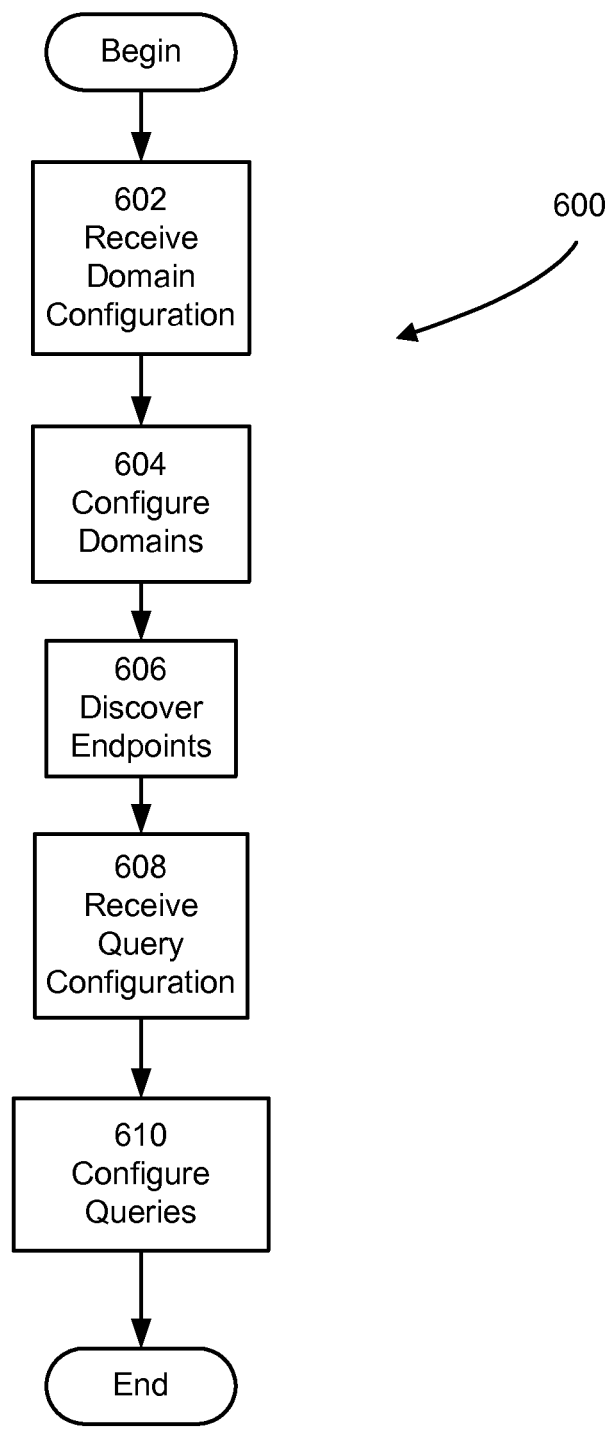
FIG. 6 is a flow diagram illustrating a process of configuring an energy management gateway.

As described above with reference to the act 504 of the process 500, some examples perform an act of configuring a gateway. FIG. 6 illustrates an exemplary process 600 for performing the act 502 in which an energy management system, such as the energy management system 100, configures a gateway. As shown in FIG. 6, the process 600 includes acts of receiving domain configuration information, configuring domains, discovering endpoints, receiving query configuration information and configuring queries.

In act 602, domain configuration information is received. According to some examples, an energy management gateway, such as the gateway 306, receives the domain configuration information from an EnergyWise configurator, such as the EnergyWise configurator resident on the BMS workstation 302. In these examples, the energy management gateway stores the domain configuration information in a local configuration data storage device, such as one or more text files.

In one example, the domain configuration information is organized according to the structures specified in Tables 4 and 5:

TABLE 4

| Gateway | |
| --- | --- |
| Hostname | "Gateway HostName" |
| IPAddress | IPv4 address or "DHCP" |
| SubnetMask | Ignored if DHCP |
| DefaultGateway | Ignored if DHCP |
| Queries Importance | 0-100 |
| SUM Queries RefreshRate | 0-65535 (seconds)/default to 0 if missing |

TABLE 5

| Domains | |
| --- | --- |
| DomainName | "Domain Name" |
| EntryPoint Address | IPv4 address |
| SecretKey | Secret key/password |
| EntryPoint Port | 1025-65535 - default 43400 used if missing |
| Queries Importance | 0-100/default from Global if missing |
| SUM Queries RefreshRate | default from Global if missing |

In act 604, the energy management gateway is configured with gateway and domain configuration information. In some examples, the energy management gateway configures itself using the local configuration data storage device described in the act 602. In these examples, the energy management gateway first opens a local log data storage device, such as a text file, to log operations performed (or errors and warnings encountered) during configuration and operation of the gateway. In at least one example, the energy management gateway creates and maintains the log file using a JSON library. Next, the energy management gateway opens the local configuration data storage device and loads the operational parameters contained therein into memory. According to one example, loading the operational parameters into memory causes the energy management gateway to set gateway communication and global parameters and define EnergyWise domains and entry points (domain names, IP Addresses, security keys, etc.).

In act 606, endpoints are discovered. According to some examples, the energy management gateway discovers the endpoints by issuing a collect query to the entry points configured in the act 604. Upon receipt of a list of endpoints from the entry points, the energy management gateway provides the list to the configurator for use in query configuration. In some examples, this list includes both an identifier of each endpoint and its characteristics (name, role, etc.).

In act 608, query configuration information is received. According to some examples, the energy management gateway receives the query configuration information from the configurator. In these examples, the energy management gateway stores the query configuration information in the local configuration data storage device. In one example, the query configuration information is organized according to the structure specified in Table 6:

TABLE 6

| Query | |
| --- | --- |
| Type | "Domain Name" |
| DomainName | IPv4 address |
| NodeName | Secret key/password |
| RoleName | 1025-65535 - default 43400 used if missing |

TABLE 6-continued

| Query | |
| --- | --- |
| DeviceType | "Device Name", Empty or Null |
| Keywords | "Keywords", Empty or Null |
| Importance | 0-100/default from Domain if missing |
| PollingRate | 0-65535 (seconds)/default from Domain if missing |

In some examples, the energy management gateway implements an inheritance process targeting operational parameters (such as the Importance and RefreshRate) specified in Tables 4-6. This inheritance process replaces an unspecified value for a qualifier with either a domain or global default value.

In act 610, the energy management gateway is configured with query information. In some examples, the energy management gateway configures itself using the local configuration data storage device. In these examples, the energy management gateway opens the local configuration data storage device and loads the operational parameters contained therein into memory. According to one example, loading these operational parameters into memory causes the energy management gateway to create EnergyWise Queries, save the configuration to the local configuration data storage device and upload the local configuration data storage device to a configurator. The process 600 ends after execution of the act 610.

Figure 7:
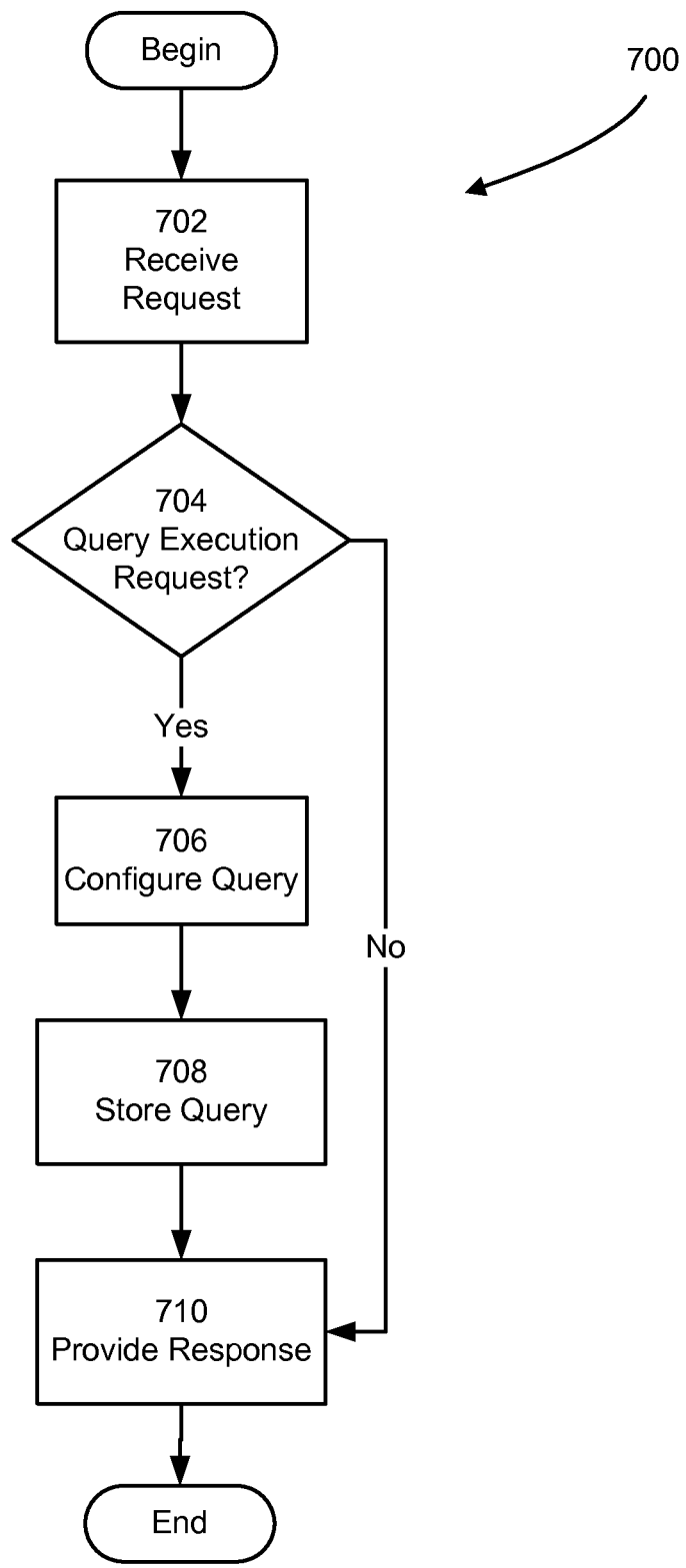
FIG. 7 is a flow diagram illustrating a process of translating messages into queries.

As described above with reference to the act 504 of the process 500, some examples perform an act of processing energy management information. FIG. 7 illustrates an exemplary process 700 for performing the act 504 in which an energy management gateway processes the energy management information. As shown in FIG. 7, the process 700 includes acts of receiving energy management information including a request, determining whether the request requires execution of a query, configuring the query, storing the request to execute the query and providing a response to the energy management information.

In act 702, energy management information including a request is received. In some examples, an energy management gateway, such as the gateway 306, receives the request from a BMS controller, such as the BMS controller 304. According to these examples, a MODBUS serial or TCP driver resident on the BMS controller 304 sets one or more MODBUS registers to predetermined values that request power usage information or execution of a particular EnergyWise query.

In act 704, the energy management gateway determines if the energy management information includes a request that requires execution of a particular EnergyWise query. If so, the energy management gateway executes act 706. Otherwise the energy management gateway executes act 710.

In act 706, the query is configured. In some examples, the energy management gateway configures the query based on the values of the MODBUS registers set in act 702. In these examples, the energy management gateway reads the MODBUS registers and alters the EnergyWise query identified by the values of the MODBUS registers in the manner specified by the values of the MODBUS registers.

In act 708, the energy management gateway stores a request to execute the EnergyWise query. In some examples, the energy management gateway stores the query execution request in a designated memory location, such as within the shared data storage device illustrated with reference to FIG. 2B. In other examples, the energy management gateway stores the request in a designated memory location within another form of memory. As is described further below, the query execution request is subject to future execution by the energy management gateway.

In act 710, the energy management gateway provides a response to the energy management information. In some examples, the energy management gateway provides the response to the BMS controller via a MODBUS runtime interface. In these examples, the energy management gateway provides the response by transmitting packets with the MODBUS registers and values determined in act 804 to the MODBUS Serial or TCP driver resident on the BMS controller. In examples where the energy management information is a request that allows asynchronous execution of an EnergyWise query, the response includes an acknowledgement of the request. In examples where the energy management information requires synchronous execution of an EnergyWise query, the response includes the results of the query. In examples where the energy management information is a request that does not require execution of an EnergyWise query, the response includes information retrieved from a local data storage device, such as the shared data storage device described above. The process 700 ends after execution of the act 710.

Figure 8:
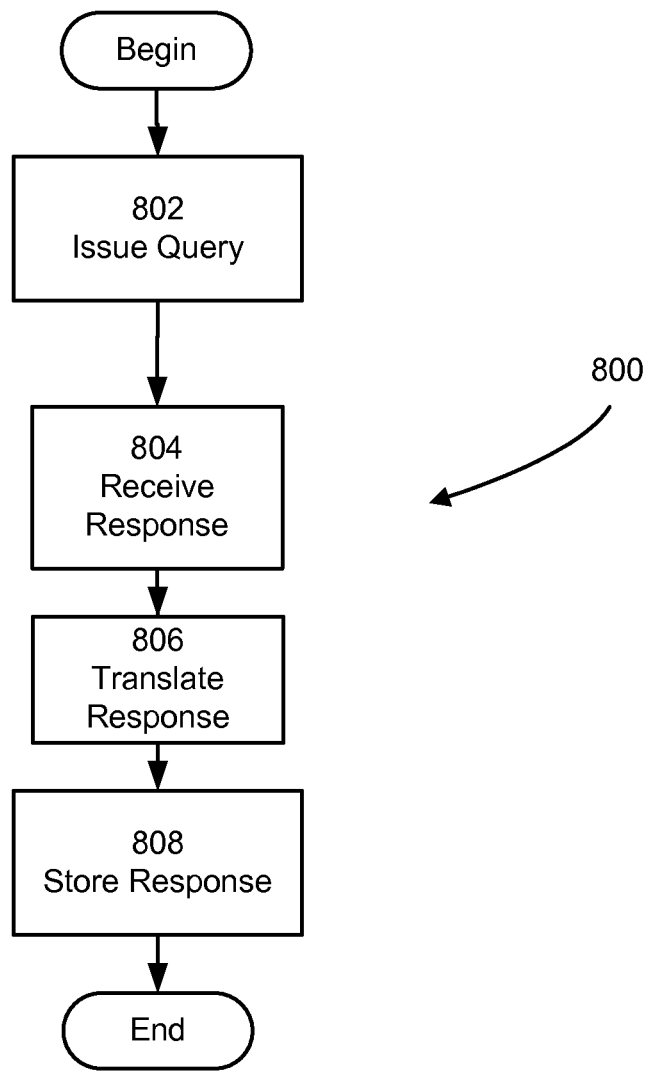
FIG. 8 is a flow diagram illustrating a process of providing query results.

As described above with reference to the act 506 of the process 500, some examples perform an act of executing queries. FIG. 8 illustrates an exemplary process 800 for performing the act 506 in which an energy management gateway executes the queries. As shown in FIG. 8, the process 800 includes acts of issuing a query, receiving a response to the query, translating the response and storing the response.

In act 802, the energy management gateway issues an EnergyWise query according to a predetermined schedule or in response to finding a query execution request at a designated memory location. According to various examples, the designated memory location may be disposed within a local data storage device, such as the shared data storage device describe above, or in some other memory location. In some examples, the energy management gateway issues the EnergyWise query by transmitting the query to one or more entry points via an EnergyWise interface that utilizes a CISCO library. In these examples, the one or more entry points are entry points of the domains that include the endpoints targeted by the query.

In act 804, a response to the query is received. In some examples, an energy management gateway, such as the gateway 306, receives the response from an entry point, such as the CISCO router 210. According to these examples, an EnergyWise interface that utilizes a CISCO library receives the response. In one example, the response contains information indicating a number of endpoints that issued an acknowledgement to the entry point, a number of endpoints that issued a negative acknowledgement to the entry point, if a Sum command was issued, the total energy usage (in Watts) and, if an error occurred, an error code.

In act 806, the response is translated. In some examples, the energy management gateway translates the response based on a map that associates MODBUS registers and values with EnergyWise response values. In these examples, the energy management gateway reads and parses the EnergyWise response values, determines the MODBUS registers and values that are associated with the EnergyWise response values and sets the determined MODBUS registers to the determined values. In one example, the MODBUS registers reflect the health status of the gateway, the health status of entry points, the overall result of the query executed (success or failure) and, if the query was a Sum query, the total energy usage. In another example, the MODBUS registers indicate a timestamp reflecting when the query was executed, an execution schedule for repeating queries, the importance of the query, the number of endpoints that issued an acknowledgment of the query and the number of endpoints that issued a negative acknowledgment of the query.

In act 808, the energy management gateway stores the response. In some examples, the energy management gateway stores the response in a local data storage device, such as the shared data storage device described above. As discussed above, these responses may be provided to a requesting BMS controller immediately, as part of the process 700, or may be provided in response to a subsequent request by the BMS controller. The process 800 ends after execution of the act 808.

Figure 9:
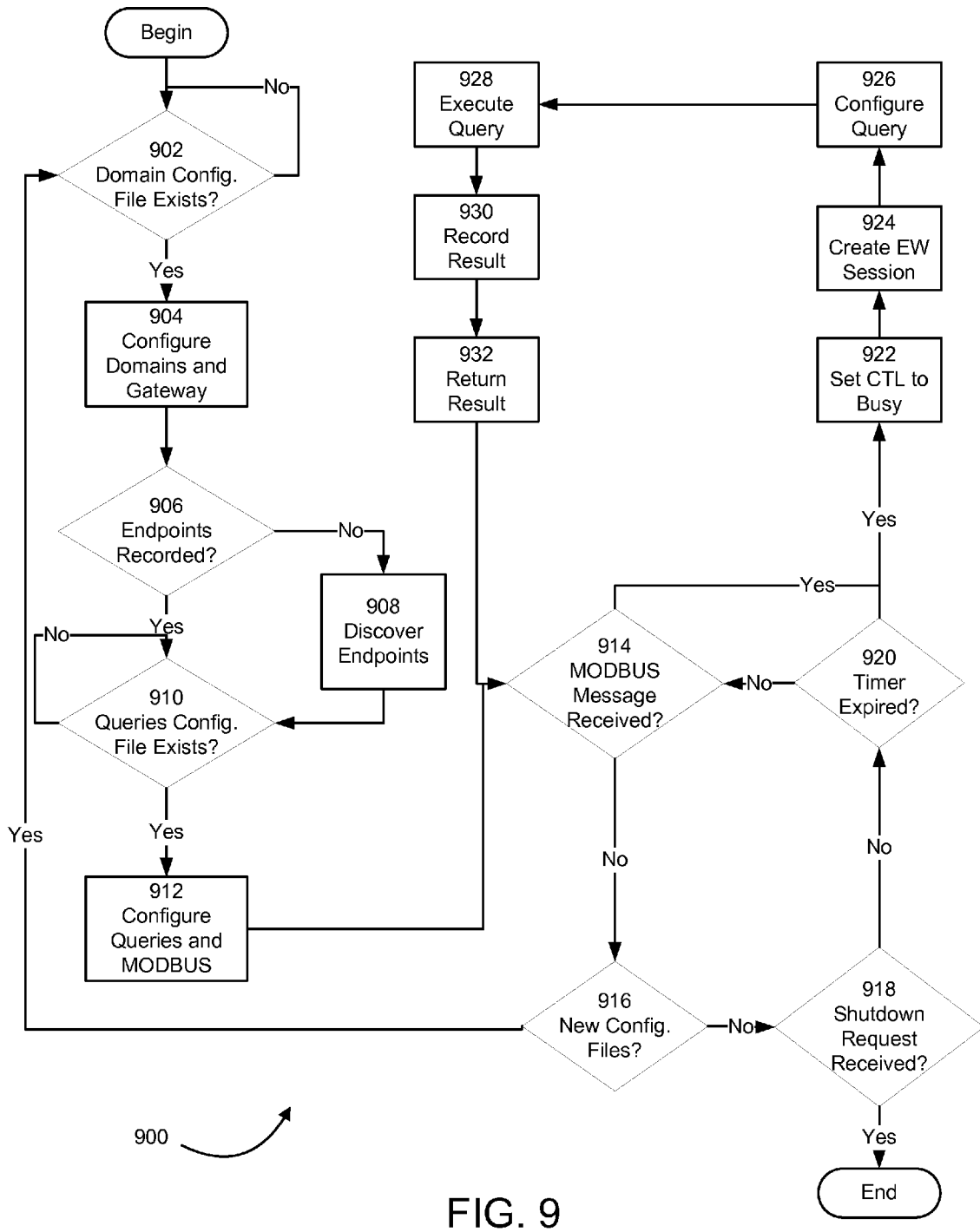
FIG. 9 is a flow diagram illustrating a process of facilitating communications between devices.

FIG. 9 illustrates another example process 900 of configuring and implementing an energy management gateway. As shown in FIG. 9, the process 900 begins in act 902. In the act 902, an energy management gateway determines whether a domain configuration file exists at a predetermined location. If so, the energy management gateway configures itself to communicate with the domains specified in the domain configuration file in act 904. Otherwise, the energy management gateway remains in the act 902 until deposit of the domain configuration file.

In act 906, the energy management gateway determines whether the endpoints included in the domains are recorded within a local endpoints file. If not, the energy management gateway discovers endpoint information for the domains by issuing a collect query to the entry points of the domains in act 908. In the act 908, the energy management gateway also saves the endpoint information returned by the collect query in a local endpoints file.

In act 910, the energy management gateway determines whether a query configuration file exists at a predetermined location. If so, in act 912 the energy management gateway configures queries and allocates MODBUS registers with the query configuration information specified in the query configuration file. Also in the act 912, the energy management gateway saves the configuration results to a log file, clears all MODBUS registers and sets appropriate health statuses. Otherwise, the energy management gateway remains in the act 910 until deposit of the query configuration file.

In act 914, the energy management gateway determines whether a MODBUS message has been received from a BMS client. If so, the energy management gateway proceeds to act 922 to execute the query indicated in the MODBUS message. Otherwise, the energy management gateway determines whether new configuration files have been received in act 916. If so, the energy management gateway proceeds to the act 902. If not, the energy management gateway determines whether a shutdown of the gateway is imminent. If so, the process 900 ends. Otherwise, the energy management gateway determines whether a query scheduled for repeating execution is due to be executed again. If not, the energy management gateway proceeds to the act 914. If so, the energy management gateway proceeds to the act 922 to execute the repeating query.

In the act 922, the energy management gateway sets a CTL variable to the value of BUSY. In act 924, the energy management gateway creates a new EnergyWise session with the domain targeted by the query being executed. In act 926, the energy management gateway configures the query to be executed according to the configuration information of the query and the registers included in the MODBUS message. First, the energy management gateway initializes the domain name, node name, role name, device type and keywords qualifiers to the values configured for the query. Next, the energy management gateway sets the importance level qualifier to a value specified by, in increasing order of preference, either the global configuration information, the domain configuration information, the query configuration information, or the MODBUS message. If the query to be executed is a set query, the energy management gateway sets the power level qualifier to a value specified by, in increasing order of preference, either the global configuration information, the domain configuration information, the query configuration information, or the MODBUS message. If the MODBUS message indicates that wildcards are to be used, the energy management gateway appends the wild character to the appropriate strings.

In act 928, the energy management gateway 928 executes the query by providing it to the entry points of the domains with endpoints targeted by the query. In act 930, the energy management gateway records the result of the execution of the query. If an error occurred during execution of the query, the energy management gateway records the value of the returned error code in the CTL MODBUS register. Next, the energy management gateway records the timestamp of the execution of the query in the TSYM, TSDH AND TSMS MODBUS registers, records the number of ACKs received in the ACKS MODBUS register and records the number of NACKs received in the NACKS MODBUS register. If the query executed was a sum query, the energy management gateway records power usage in the PKW, PW and PMW MODBUS registers. In act 932, the energy management gateway deletes the EnergyWise session, sets the value of the CTL MODBUS register to 0 if no error occurred and transmits a MODBUS message to the BMS controller including the query results stored within the MODBUS registers as described above.

Processes 500, 600, 700, 800 and 900 each include one particular sequence of acts in a particular example. The acts included in processes may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. In addition, as discussed above, in at least one example, the acts are performed on a particular, specially configured machine, namely a computer system configured according to the examples disclosed herein.

MODBUS Registers

One example of an energy management gateway using the following MODBUS registers to communicate with a BMS controller.

GHS—Gateway Health Status Register

This register will report the health status of the system using fault codes.

0—The Gateway is in health status and is operating.

1—Communication fault. The gateway cannot communicate to the CISCO EnergyWise network.

2—Gateway service is not running (e.g. failed to start, crashed, etc.).

3—Others hardware or software failures.

GIMP—Global Importance

This register exposes the importance level (0-100) inherited by all the queries, whether not otherwise specified.

GRR—Global Refresh Rate

This register exposes the refresh rate (0 to 65535 seconds) inherited by all the SUM queries, whether not otherwise specified.

DHS—Domain Health Status

This register will report the health status of the Domain using fault codes.

0—The Gateway is in health status and is operating.

1—Communication fault. The gateway cannot communicate to the CISCO EnergyWise Domain 2—Others hardware or software failures.

DIMP—Domain Importance

This register exposes the importance level (0-100) inherited by all the queries within the Domain, whether not otherwise specified.

DRR—Domain Refresh Rate

This register exposes the refresh rate (0 to 65535 seconds) inherited by all the SUM queries within the Domain, whether not otherwise specified.

CTL—Query Control

This register is used to report the query execution status and to trigger the query execution from the BMS MODBUS client. The register values are shown in the table below.

0—Query executed—Success

1—Trigger Query Execution

2—The query is being executed/Gateway busy

3—Query Execution failed

PKW PW PMW—Power Usage

These registers are filled as a result of a SUM query. They contain the power usage in kilowatts, watts, and milliwatts, respectively. To calculate the total power, use the following:

$$Total\ Power = (PKW*1000) + PW + (PMW/1000)$$

LEV—Power Level

This register is used only with SET queries. It exposes the power level (0-10) to be set.

TSYM TSDH TSMS—Query Execution Timestamp

This registers are filled with the last execution's timestamp of a query.

The datetime format will be:

Year—yy—TSYM (bits 0-7)

Month—MM—TSYM (bits 8-15)

Day—dd—TSDH (bits 0-7)

Hour—hh—TSDH (bits 8-15)

Minutes—mm—TSMS (bits 0-7)

Seconds—ss—TSMS (bits 8-15)

IMP—Query Importance

This register exposes the query's importance level (0-100).

RR—Query Refresh Rate

This register exposes the query's refresh rate (0 to 65535 seconds). This only applies to SUM queries.

ACKS—Total number of ACKS Received

This is the number of nodes that matched the query and executed it successfully.

NACKS—Total Number of NACKS Received

This is the number of nodes that matched the query but did not execute it successfully.

Having thus described several aspects of at least one example, it is to be appreciated that various alterations, modifications, and improvements will readily occur to those skilled in the art. For instance, while some examples disclosed herein focus on MODBUS protocol based BMS clients and controller, other examples include BMS clients and controller that support other protocols such as BACnet and LON. Such examples, alterations, modifications, and improvements are intended to be part of this disclosure, and are intended to be within the scope of the examples discussed herein. Accordingly, the foregoing description and drawings are by way of example only.

What is claimed is:

1. An energy management gateway comprising:

a memory;

a processor coupled to the memory;
a building management system (BMS) interface executed by the processor and configured to receive a first message, the first message being structured according to an industrial protocol;
an energy management system interface executed by the processor and configured to:
   translate the first message into a second message structured according to an energy management protocol different from the industrial protocol, the second message including a query comprising at least one command and a set of qualifiers, the query being addressed to at least one first endpoint and including at least one of a sum command and a set command; and
   provide the second message to a first domain member of a first domain including the at least one first endpoint, the first domain member being a device other than the at least one first endpoint,
      wherein the sequence of messages includes instructions that will cause the at least one processor to:
         receive the first message using the MODBUS protocol; and
         translate the first message into a second message structured according to the EnergyWise protocol.

2. The energy management gateway according to claim 1, wherein the industrial protocol includes MODBUS.

3. The energy management gateway according to claim 1, wherein the energy management protocol includes EnergyWise.

4. The energy management gateway according to claim 1, wherein the energy management system interface is configured to provide the second message to a router.

5. The energy management gateway according to claim 1, wherein the energy management system interface is further configured to provide the second message to a second domain member of a second domain including at least one second endpoint addressed by the query.

6. The energy management gateway according to claim 5, wherein a subset of the set of qualifiers addresses the query to the at least one first endpoint and the at least one second endpoint.

7. The energy management gateway according to claim 6, wherein the subset includes a domain name qualifier with a value including a wildcard.

8. The energy management gateway according to claim 1, wherein the energy management system interface is further configured to:
   receive a third message from the first domain member, the third message structured according to the energy management protocol; and
   translate the third message into a fourth message structured according to the industrial protocol; and
wherein the BMS interface is further configured to:
   receive the first message from an external entity; and
   provide the fourth message to the external entity.

9. The energy management gateway according to claim 8, wherein the BMS interface is configured to:
   receive the first message from a BMS controller; and
   provide the fourth message to the BMS controller.

10. A method of facilitating communication between devices using a computer system, the method comprising:
   receiving, by the computer system, a first message, the first message being structured according to an industrial protocol;
   translating, by the computer system, the first message into a second message structured according to an energy management protocol different from the industrial protocol, the second message including a query comprising at least one command and a set of qualifiers, the query being addressed to at least one first endpoint and including at least one of a sum command and a set command; and
   providing, by the computer system, the second message to a first domain member of a first domain including the at least one first endpoint, the first domain member being a device other than the at least one first endpoint,
      wherein the sequence of messages includes instructions that will cause the at least one processor to:
         receive the first message using the MODBUS protocol; and
         translate the first message into a second message structured according to the EnergyWise protocol.

11. The method according to claim 10, wherein receiving, by the computer system, the first message includes receiving a message structured according to the MODBUS protocol.

12. The method according to claim 10, wherein translating, by the computer system, the first message into the second message includes translating a message into the EnergyWise protocol.

13. The method according to claim 10, wherein providing, by the computer system, the second message to the first domain member includes providing the second message to a router.

14. The method according to claim 10, further comprising providing the second message to a second domain member of a second domain including at least one second endpoint addressed by the query.

15. The method according to claim 14, wherein translating, by the computer system, the first message into the second message includes addressing the query to the at least one first endpoint and the at least one second endpoint.

16. The method according to claim 15, wherein addressing the query includes assigning wildcard to a domain name qualifier.

17. The method according to claim 10, wherein receiving, by the computer system, the first message includes receiving the first message from an external entity and the method further comprises:
   receiving a third message from the first domain member, the third message structured according to the energy management protocol;
   translating the third message into a fourth message structured according to the industrial protocol; and
   providing the fourth message to the external entity.

18. The method according to claim 17, wherein receiving the first message from the external entity includes receiving the first message from a BMS controller.

19. A non-transitory computer readable medium having stored thereon sequences of instruction for facilitating communication between devices using a computer system including instructions that will cause at least one processor to:
   receive a first message structured according to an industrial protocol;
   translate the first message into a second message structured according to an energy management protocol different from the industrial protocol, the second message including a query comprising at least one command and a set of qualifiers, the query being addressed to at least one first endpoint and including at least one of a sum command and a set command; and provide the second message to a first domain member of a first domain including the at least one first endpoint, the first domain member being a device other than the at least one first endpoint,
wherein the sequences of instruction include instructions that will cause the at least one processor to:
receive the first message using the MODBUS protocol; and
translate the first message into a second message structured according to the EnergyWise protocol.

* * * * *

UNITED STATES PATENT AND TRADEMARK OFFICE
CERTIFICATE OF CORRECTION

| | | |
|---|---|---|
| PATENT NO. | : 8,606,407 B2 | |
| APPLICATION NO. | : 13/163796 | |
| DATED | : December 10, 2013 | |
| INVENTOR(S) | : William Anthony White, III et al. | |

It is certified that error appears in the above-identified patent and that said Letters Patent is hereby corrected as shown below:

In the Specification:

At column 9, line number 53, delete "such" and replace with --such as--.

At column 17, line number 51, delete "one more computer systems" and replace with --one or more computer systems--.

In the Claims:

At column 28, claim number 10, line number 14, delete "the".

Signed and Sealed this
Twenty-third Day of June, 2015

Michelle K. Lee
*Director of the United States Patent and Trademark Office*